US012141745B2

(12) United States Patent  
Løken

(10) Patent No.: US 12,141,745 B2  
(45) Date of Patent: Nov. 12, 2024

(54) METHOD AND SYSTEM TO DETERMINE AN ORIGINATING TRACEABILITY APPLICATION FOR A PRODUCT ITEM USING A SERIALIZED CODE

(71) Applicant: KEZZLER AS, Oslo (NO)

(72) Inventor: Magnar Løken, Oslo (NO)

(73) Assignee: KEZZLER AS, Oslo (NO)

( * ) Notice: Subject to any disclaimer, the term of this patent is extended or adjusted under 35 U.S.C. 154(b) by 0 days.

(21) Appl. No.: 17/402,183

(22) Filed: Aug. 13, 2021

(65) Prior Publication Data

US 2023/0047884 A1  Feb. 16, 2023

(51) Int. Cl.
*G06Q 10/087* (2023.01)

(52) U.S. Cl.
CPC .................................. *G06Q 10/087* (2013.01)

(58) Field of Classification Search
CPC .... G06Q 10/087; G06Q 10/08; G06Q 20/203; G06Q 30/0223; G06Q 10/0833; G06Q 10/06; G06Q 10/0631; Y04S 10/56; Y10S 707/949; G06F 16/955; G06F 16/2456; G06F 16/9024; G06F 16/9038; G06F 16/9535; G06F 16/9537; G06F 21/552; G06F 21/57; G06F 9/455; G06F 9/545; G06F 21/55; G06F 21/554; G06F 21/10; H04L 67/563; H04L 67/306; H04L 43/045; H04L 43/06; H04L 63/10; H04L 63/1408; H04L 63/1425; H04L 63/0823; H04L 63/1416; H04L 67/535; H04L 69/329; H04L 2463/102; H04L 41/0213; H04L 41/046; H04L 41/069; H04L 41/0893; H04L 41/0896; H04L 41/5003; H04L 41/5025; H04L 41/5061; H04L 41/5067; H04L 41/5087; H04L 41/509; H04L 41/5093; H04L 43/00; H04L 43/0817; H04L 43/0847; H04L 43/16; H04L 63/0414; H04L 63/0428; H04L 63/08; H04L 63/083; H04L 63/104; H04M 3/2254; H04M 3/2263; Y02P 90/80

See application file for complete search history.

(56) References Cited

U.S. PATENT DOCUMENTS 8,423,770 B2  4/2013  Loken D.Y.
8,700,501 B2  4/2014  Loken
(Continued)

FOREIGN PATENT DOCUMENTS

| FR | 3 102 279 A1 | 4/2021 |
| WO | WO 2006/137633 A1 | 12/2006 |
| WO | WO 2020/119955 A1 | 6/2020 |

*Primary Examiner* — Fahd A Obeid
*Assistant Examiner* — Avia Salman
(74) *Attorney, Agent, or Firm* — Birch, Stewart, Kolasch & Birch, LLP

(57) ABSTRACT

A method for routing unique identifier requests to an appropriate traceability application includes receiving a request from a client in the network, the request including a unique identifier; forwarding the identifier to a first traceability application from a list of potential traceability applications; receiving a response from the first server; and repeating querying a subsequent traceability application from the list, until an originating traceability application is found that can process the request, in response to the first server being unable to confirm it can process the request.

20 Claims, 3 Drawing Sheets

(56) References Cited

U.S. PATENT DOCUMENTS

Figure 1:
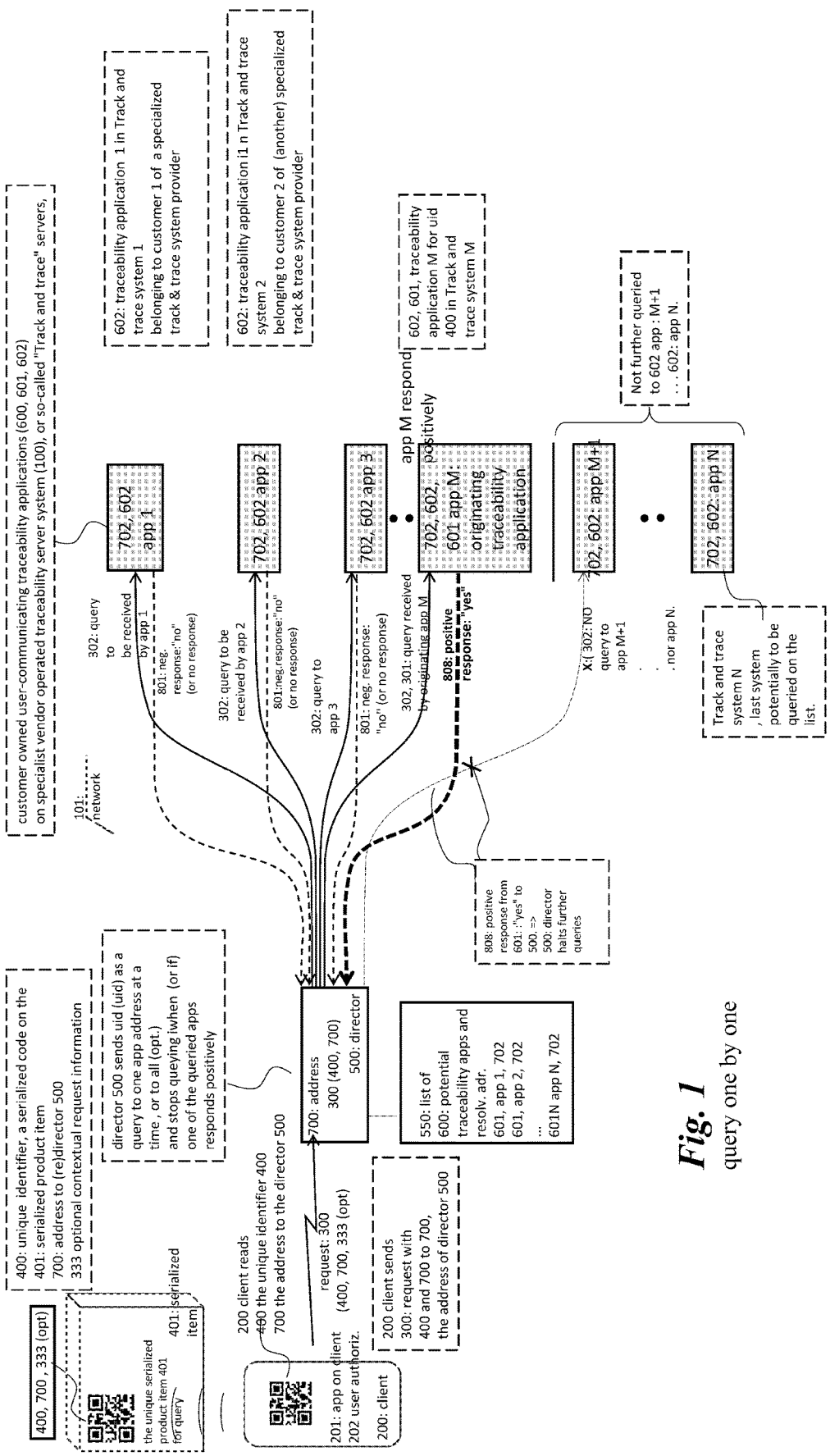

| | | | |
|---|---|---|---|
| 8,996,610 B1* | 3/2015 | Sureshchandra | G06F 16/9566 709/227 |
| 9,794,321 B2* | 10/2017 | Trifa | H04L 67/02 |
| 10,074,063 B2 | 9/2018 | Loken et al. | |
| 10,607,169 B1 | 3/2020 | Carlisle et al. | |
| 11,418,490 B2 | 8/2022 | Shribman et al. | |
| 2005/0209947 A1 | 9/2005 | Shafer | |
| 2007/0185775 A1* | 8/2007 | Lawton | G06Q 50/188 705/26.8 |
| 2008/0021767 A1 | 1/2008 | Benson et al. | |
| 2008/0148365 A1 | 6/2008 | Yoshida et al. | |
| 2011/0087733 A1 | 4/2011 | Shribman et al. | |
| 2012/0022944 A1 | 1/2012 | Volpi | |
| 2012/0181330 A1 | 7/2012 | Kim | |
| 2012/0265593 A1 | 10/2012 | Etheredge et al. | |
| 2012/0278242 A1 | 11/2012 | Griffith | |
| 2013/0006742 A1 | 1/2013 | Richard | |
| 2014/0006098 A1 | 1/2014 | Oliveira et al. | |
| 2014/0249942 A1 | 9/2014 | Hicks et al. | |
| 2014/0324627 A1 | 10/2014 | Haver et al. | |
| 2015/0102100 A1 | 4/2015 | Hattrup et al. | |
| 2015/0112784 A1 | 4/2015 | Lupoli et al. | |
| 2015/0154568 A1 | 6/2015 | Gu | |
| 2015/0220966 A1 | 8/2015 | Sullivan et al. | |
| 2015/0324831 A1 | 11/2015 | Barua et al. | |
| 2015/0363829 A1 | 12/2015 | Landers | |
| 2016/0132921 A1 | 5/2016 | Calvo Martinez et al. | |
| 2018/0025185 A1 | 1/2018 | Hattrup et al. | |
| 2019/0050883 A1 | 2/2019 | Wedderburn | |
| 2019/0373084 A1* | 12/2019 | Reynolds | H04L 67/34 |
| 2020/0226617 A1 | 7/2020 | Meadow | |
| 2021/0090011 A1* | 3/2021 | Rae | G06F 16/955 |

\* cited by examiner query one by one

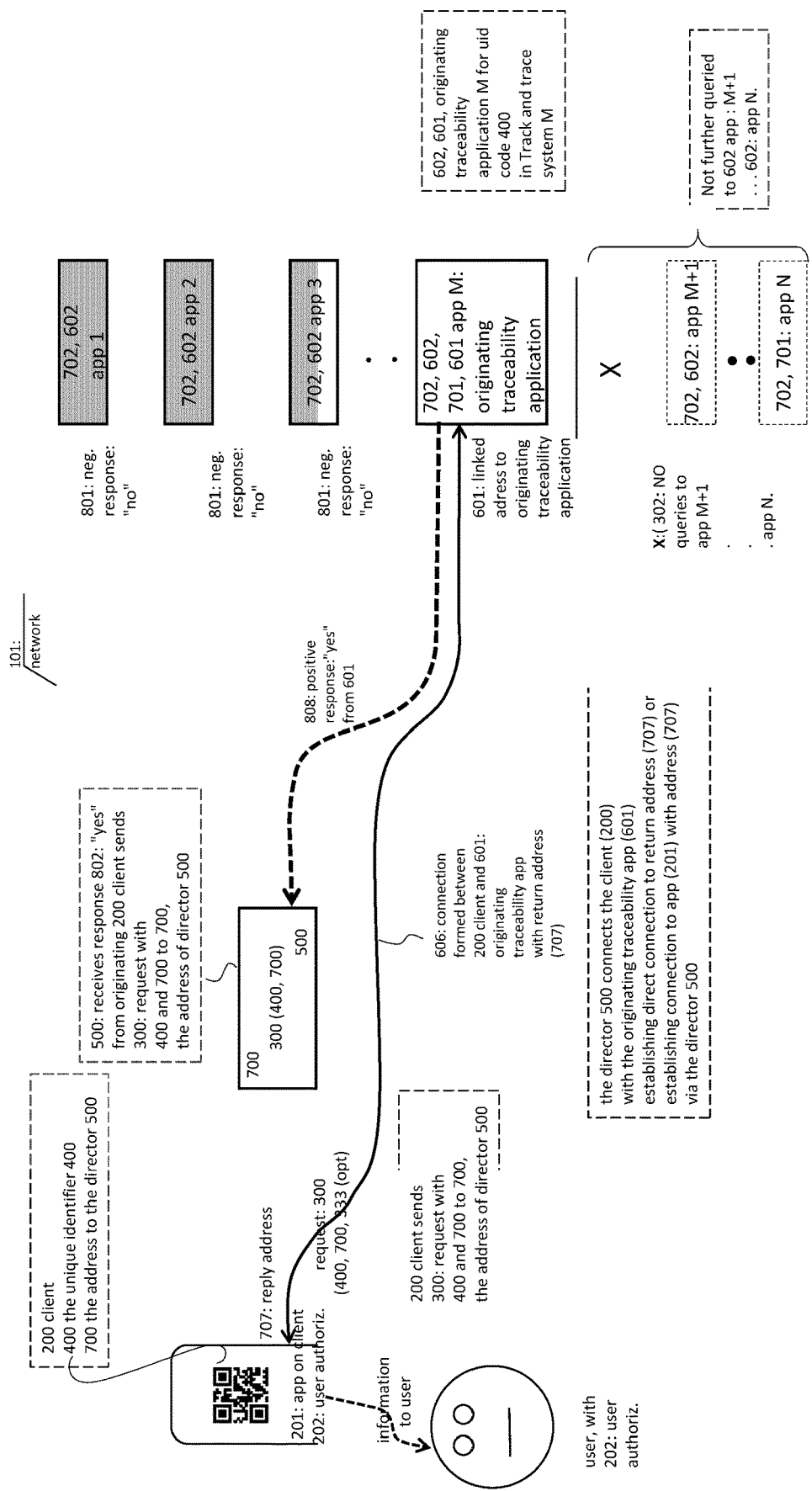
Fig. 2 facilitate connection

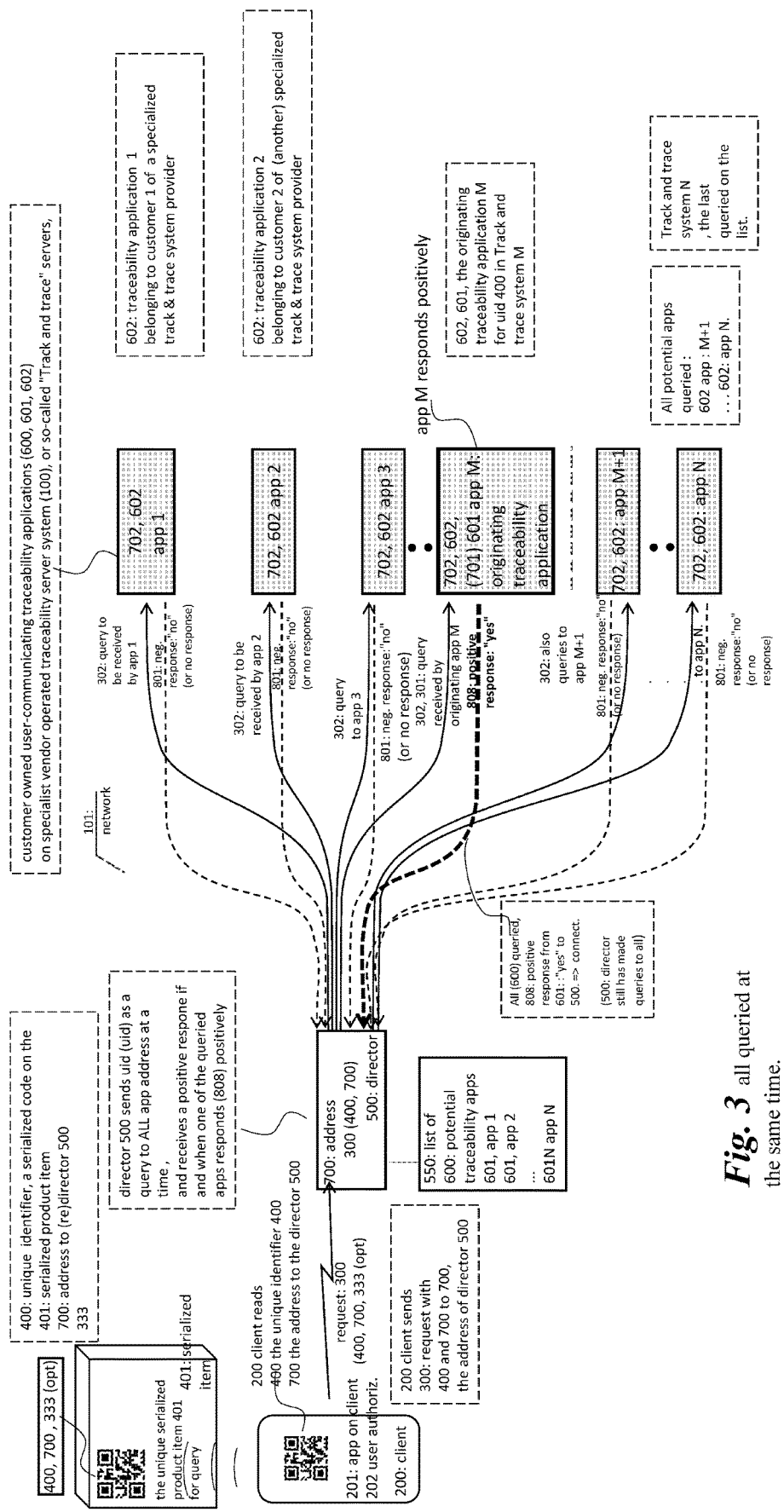
Fig. 3 all queried at the same time.

METHOD AND SYSTEM TO DETERMINE AN ORIGINATING TRACEABILITY APPLICATION FOR A PRODUCT ITEM USING A SERIALIZED CODE

INTRODUCTION

The present invention is a method and system to determine an originating traceability application for a product item using a serialized code.

BACKGROUND OF THE INVENTION

Serialization of product items and traceability has become increasingly widespread in recent years. A uniquely identifiable product code on an item is recognized by a computer implemented traceability system in "the cloud", and a response is returned from the traceability system to a user with information about the product item. As the demand for traceability and serialization increases, more and more traceability systems have been implemented.

Traceability applications are part of computer systems that create and manage serialized codes that can also be aggregated and used in a track and trace system. Traceability applications are here to be understood as systems having capabilities and functions as explained herein.

For accumulating information about a product item, and later access it via a computer communication network such as in the cloud on the Internet, a product item is marked with at least a unique identifier (uid) and usually an Uniform Resource Identifier (URI) or a Universal Resource Locator (URL). A problem with this information when labelling it on the product is that this type of specific information can be quite extensive in terms of length of text and numbers and symbology that needs to be marked on the product item due to large series of otherwise identical products and a long, detailed specific target URL to address among many other different product targets, and the available space for marking may be very limited.

The background art method has several problems in various related technical fields.

Marking Speed

A particular problem is that printing or marking QR-codes (or electronic tags on any kind, RFID, NFC, etc) on a production line is relatively time consuming. The more information that is carried by a QR-code the longer time it will take to print it. Effectively this will slow down production speed since today the printing speeds of QR-codes or any type of two-dimensional barcode are generally not keeping up with production lines speeds—at least not for an acceptable cost. It is therefore important to reduce the information in the QR-code to a minimum, including the address to the processing resource.

Ideally the code mark should be kept very short or small. Please notice that the unique identifier (uid) is really unique in all practical considerations. Another issue, typically for a provider of such traceability systems with several customers, —is to direct a myriad of different products to the right instance or system, i.e. the traceability application where the serialized code was created and originated. A resource address as used in the background art should be complete in order to lead to the properly associated application in the traceability system.

Another situation arises wherein several de-facto independent traceability system vendors need to mutually interact in order to establish an inter company or inter system industry tracing system in order to scale up interoperability. This interaction is required when a party is adding and (or retrieving) information or tracking event(s) about the serialized product item and thus the information about the new event is reflected in the traceability application. Such adding or retrieving of information events may occur during packaging of marked product items, re-packaging of marked product items, border controls, unpackaging of multi-packaged product items, and sale of product items to a supposed end user, or in transfer from one user to another user.

In a supply chain with a considerable number of companies, participants and stakeholders, and all with varying levels of capabilities and resources, that need to either add tracing events related to a serialized code on the product item to, or sometimes retrieve tracing data related to the serialized code from, another yet high number of independent traceability applications, a one-to-one integration is just not feasible.

A unique, serialized code of an initially "unknown" product item, wherein the code may be encrypted, is easily routed to an appropriate system among a large number of initially unknown originating traceability system among many potential traceablity systems, for any initially unknown party, is easily achieved with the current invention. The present invention thus enables a party or any supply chain stakeholder—that does not initially know or have relations with the unique serialized code product item owner, or the originating traceability application, to easily add basically an ad-hoc event, such as re-packaging of containers, customs checking, multi-box unpackaging, product information acquisition by a potential buyer, purchase in the shop to an end user, or the end user conducting owner registration, all events related to the serialized code, when so required. The serial code here can represent not only a product item—but any object associated with a serialized code utilized in a track and trace context such as a serialized code marked packaging box for a contained serialized product item, a serialized marked box container, or a serialized code marked shipping container. This enables and facilitates an extremely efficient "all to everyone" scalable and "incognito" interaction between seemingly "unknown" parties when using a serialized code. The invention solves this problem since if a stakeholder (a user) wishes to add an event (or retrieve data) related to the serialized code, this user in all situations, in a system according to the invention, simply forwards such a request to a single resource location applicable for all serialized codes and applicable to all users and stakeholders within the industry, thus the director of the present invention will link the serialized code (uid) with the resulting correctly traceability associated application without the users need for any knowledge about the serialized code (and thus product) and the originating traceablity application in the system wherein the event is correctly added and managed. Further rules, protocols, parameters and criteria that might be enforced for such interactions, such as for instance authorization and authentications, is not a scope of this invention.

The present invention is thus related to serialized product items being marked efficiently, carrying a brief initial uniform resource identifier (URI) and in such a way that based on the serialized code, it is easy to establish and facilitate the interaction between stakeholders application in a supply chain and the appropriate originating traceability application.

U.S. Pat. No. 9,794,321 Trifa et al. relates to a computing system, and a redirector, configured to receive an object identifier and contextual information from a client application. Based on that object identifier and the contextual information that is analysed against a predefined set of rules, the redirector maps the object identifier and the contextual information to a deduced entry point associated with a specific computer application among a plurality of applications. Then access is provided to said specific computer application to the client application and user.

That background art employs a rules database in front of the plurality of applications whereby applying the rules on the contextual information will determine which application shall receive the request, and how to respond, based on the same contextual information.

In comparison with this background art, the current invention does not use any such rules database or analysing logical capability in front of the plurality of applications to determine which application shall process the request or indicate to the applications how to respond.

Traceability systems of the background art involve a large number of different complex configurations and rule sets that are difficult to generate and then later difficult and demanding to maintain in a redirector rules database. To keep the rules and a redirector database up to date at all times can be a labour and resource intensive task. This maintenance of rules is especially labor demanding when it comes to incorporating all different and fast growing number of user profiles using a client whose context must be mirrored in the rules database in order that the redirector works properly and as intended. In other words, the difficulty and complexity arises partly from changes being made in one or more of the potential traceability applications, and partly from dynamic contextual information from predominantly users and user profiles that change and grow in volume every day and that needs to be updated in the rules database for ensuring the right redirector redirects to the appropriate address of the application, as well as providing the correct contextual information to the traceability applications to provide a response.

The present invention solves one or more of the above mentioned problems.

SUMMARY OF THE INVENTION

The invention is defined in the present independent claims and embodiments are described below.

BRIEF FIGURE CAPTIONS

Embodiments of the invention are illustrated in the attached drawing Figures, wherein FIG. 1 illustrates an embodiment of the invention wherein one of a plurality of serialized product items (401) each are provided with a unique identifier (400). The unique identifier (400) is read into a client (200) which sends a request to a director (500) in order to reach an originating traceability application (601) which originated the unique identifier (400). The director (500) forwards a request with the unique identifier (400) to one of a number of N traceability applications (602) (of which addresses are held on a list (550) readable by the director (500). The director sends the request (302, 301) one at a time, of which one of them may be the originating traceability application (602, 601), asking whether the receiving traceablity application (602) is an originating traceabiltiy application (601). If no response is received within reasonable time, or if a negative response (802) is received, the director may query (302) the next on the list. The one originating traceability application (602, 601) which receives the recognized request (301) is the originating traceability application (601), here denoted number M, returns a positive response (808) to the director (500), which halts its querying, and the director (500) facilitates a connection (606) between the client (200) and the originating traceability application. Further traceability applications beyond number M are not queried.

FIG. 2 illustrates that the director (500) facilitates the connection (606) between the client (200) and the originating traceability application (601).

FIG. 3 illustrates another embodiment of the invention similar to the one in FIG. 1, with the difference that the director (500) forwards a request with the unique identifier (400) to all of a number of N traceability applications (602) at the same time. The director sends the request (302, 301) all at the same time, their addresses are held on the list (550) readable by the director (500). The one originating traceability application (602, 601) which receives the recognized request (301) is the originating traceability application (601), here denoted number M, returns a positive response (808) to the director (500), and the director (500) facilitates a connection (606) between the client (200) and the originating traceability application (601). Those not being the originating traceability application need not reply, and may be instructed to do so instead of returning a negative response (802). This saves time, but if the number of potential traceability applications (602, 601) is large, such a query may generate much unnecessary traffic.

EMBODIMENTS OF THE INVENTION

The method and system according to the current invention fulfils generally the same task as the above mentioned method and system of the background art US '321 patent, but in a faster, simpler, more accurate and less resource demanding way. One of the most prominent and significant differences is that the method and system of the invention does not employ the context aware redirector nor the rules database as described in US'321, and the task of keeping such a rules database up to date is thus eliminated.

The invention provides a computer implemented traceability application network director system (100) in a network (101), comprising
  a plurality of traceability applications (600);
  a list (550) comprising the plurality of said traceability applications (600) and their resolvable network addresses/locations (702);
  a network director (500);
  a plurality of serialized product items (401), each associated with a unique identifier (400);
    wherein each said unique identifier (400) is initially created and originated or managed by an associated originating traceability application (601) within said plurality of said traceability applications (600),
    wherein all said serialized product items (401) are associated with a network address or location (700) resolvable for said network director (500) within said network (101),
  wherein a client (200) or a user via said client (200) sends a request (300) to said network director (500),
    said request (300) comprising said unique identifier (400) associated with said serialized product item (401), to establish a connection (606) to said originating traceability application (601);
  wherein
  said network director (500) is arranged to
    a)—receive said unique identifier (400) associated with said object (401) from said user and/or client (200);

b)—sending a request (302, 301) comprising said unique identifier (400) to one or more traceability applications (602, 601) of said list (550) of said plurality of traceability applications (600);

c)—said request (302, 301) comprising requesting each said queried traceability application (602, 601) to respond whether said traceability application (602, 601) recognizes said unique identifier (400) as created or managed by said traceability application (602, 601);

d)—receive a response (800) from said queried traceability application (602, 601);
- if said response (800, 801) is negative ("no") (801), disregard said queried negatively responding traceability application (602);
- if said response (800, 808) to said request (301), is a positive or affirmative response (808), then establish or facilitate a network connection (606) between said requesting client (200) with regard to said unique identifier (400) of said request (300), and said affirmative responding traceability application (601).

In an embodiment of the invention, said director (500) is arranged to send said request (302, 301) to one by one of each traceability application (602, 601) in said list (550); until said response (800, 801, 808) is a positive response (808), and
then not sending further requests (302) to further traceability applications (602) in said list (550).

Often such unique identifiers (400) are encrypted and the decryption takes place at the originating traceability application (601) in order for it to look up the request (302, 301) based on the internally decrypted unique identifier (400) in order to determine whether the request (302, 301) is a proper request (301) with an originated unique identifier (400) which shall result in an affirmative response (808). Those traceability applications (602) which are not originating traceability applications will normally not be able to even decrypt the request (302) and shall return a negative response (801) or no response.

- A first advantage of this embodiment is that the time and total work involved for sending further requests (302) is saved when a positive or affirmative response (808) is received. The number of potential traceability applications in said list (550) may considerable and be in the hundreds or thousands.
- A second further advantage of this embodiment is that it is less energy consuming for the network (101) because no signals or processing energy is required for further queries is used when said positive or affirmative response (808) is received.
- A third further advantage of this embodiment is that it reduces the traffic on said network (101) compared to querying all potential traceability applications (602) on said list (550).
- A fourth further advantage of this embodiment is that it does not evoke any energy for internal tracing to provide negative response (802) from those traceability applications (602) not queried, nor any return traffic from such not queried on said network (101).

In an embodiment of the invention said director (500) is arranged to send said request (302, 301) simultaneously to all traceability applications (602, 601) in said list (550).

An advantage of this embodiment is that it is fast to find the originating traceability application (601), however at a cost of increased traffic for querying an otherwise unnecessary number of potential candidates on the list (550).

In an embodiment of the invention, if an affirmative "yes" response (808) has not been received when said list (550) of traceability systems (600) is exhausted, then
return a response (800, 820) which is a "unique identifier (400) originating traceability application (601) not found" response (820) to said client (200).

In an embodiment of the invention, including in said request (302, 301) to said application (602) contextual information (333) comprising an instruction (333, 334) to not return any response (800) if it otherwise would return a negative response (801) in case said queried traceability application (602) is not an originating traceability application (601) of said unique identifier (400).

An advantage of this embodiment is that it only the positively responding traceability application (601) returns any response (808), the remaining requested (otherwise negatively responding) traceability applications (602) remain silent about their received request (302).

In an embodiment of the invention said traceability application (602, 601) is arranged for managing unique identifiers (400) and aggregated track and trace information based on said unique identifier (400), whereby said traceability application (602, 601) is arranged to
a) receive a unique identifier (400);
b) receive contextual information (333) pertinent and applicable to the request (302, 301) itself;
c) determine if the unique identifier (400) was created and/or is managed by said traceability application (602, 601);
d) and if the unique identifier (400) was created and/or managed by said thus originating traceability system (601);
e) process and compose a response (800, 808) according to and based on internal rules and instructions associated with said unique identifier (400) and said received request contextual information (301, 333).

For simplicity this specification uses the term 'product item', and then a serialized product item (401) which is associated with a unique identifier (400). However, a physical object or object/systems with means to store a serialized code, a unique identifier (400) with electronic means, is encompassed by the term serialized product item (401), the object associated with the unique identifier (400), such as the product item itself, all logistical containers or transportation devices, tags, labels, packaging, pallets, boxes, RFID, computers, hard discs. All material objects and media that carry a unique serialized code, a unique identifier (400) are included by the term 'serialized product item (401). Essentially, if the request (300) includes a uniquely serialized code, i.e. a unique identifier (400), the unique serialized code, the unique identifier (400) may also be a unique identifier (400) at a hierarchical level of identifiers (400) forming part of an aggregated packaging tree for general track and trace purposes as described, inter alia, by the applicant in U.S. Pat. Nos. 8,423,770, 8,700,501 and 10,074,063. Central to the present invention is how to manage the unique serialized code itself and to a lesser extent what it materially represents, since the material and hierarchichal representation is managed by the target traceability application.

Significantly, the determination of the correct/originating traceability application to be connected to is carried out based on the unique identifier uid and by the properly responding applications among the several traceability applications. (Even other applications not originally intended to respond may in rare occasions be evoked).

This means that even copies or clones of the traceability application or applications adapted to respond to the unique serialized code from other systems than the originating application can further process the transaction.

The resource address read from the serialized item (401) described in the invention is partial in the sense that it is incomplete as such and will lead to the intended proper application when using the method of the invention.

OBJECTIVES OF THE INVENTION

One objective of the present invention is to provide a system (100) and a method to reliably connect a client (200) carrying the unique identifier (400) of a serialized product item (401) to an appropriate target traceability application (601) at a customer/manufacturer associated track and trace server.

Another objective of the present invention is to provide this connection (606) between the user/client (200) to its intended system traceability application (601), without the disadvantages related to the rules database of the background art and the database maintenance related thereto. Tracing of product items using serialization and aggregation are operated for various clients by expert vendors of traceability systems. The software and technology implemented for each customer is often based on the same core solution but has then has configurations, special developments and adjustments specific to each different customer and their customer system. Another common practice is that each customer has their own tracing system running instance operated on their behalf by the traceability vendor or provider. There are mainly two reasons for this; all the data are kept private and securely for the customer since there is no sharing of resources with other customers (nor other traceability system expert vendors) in any way with other customers that the traceability system expert vendor is operating tracing systems for, on their behalf. Further, the traceability system can be managed without the need of the expert vendor/customers having to wait for common developments of the software by the expert vendor to be distributed for all customers. It also makes operations less complex and efficient for the expert vendor.

In relation to the present invention, a client (200) is a piece of hardware and/or computer software that is capable of processing computer instructions and computer code and also able to communicate through computer (-enabled) networks and thus connect and communicate with other clients, software and computers. The client (200) device is typically a mobile unit such as a mobile telephone or a tablet. These preferably comprise a device to read a tag, such as a camera to read a barcode, a QR code or other optically encoded data, or means for reading data from RFID tags.

As an example the client (200) may be a smartphone with an app (201) to interact with a user and communicate. As a further example the client (200) communicates one or more scanned serialized code (400) from a serialised product item (401) to a track and trace system (601) of a customer system (100) run on a server at a specialist vendor, and exchanges information based on the serialized code (400).

A user is a person that can interact with such a client (200) to take advantage of the client's (200) capabilities to perform and operate tasks and functions available by the client (200) and its system (100) associated app (201). When a user interacts with a client (200), that interaction is also sometimes referred to as "the user experience".

A user profile (202 is understood to be an authorization to interact with the client (200) and specific and uniquely identifiable information related to the user that will govern the interaction with the client (200). Such user profile (202) information is very commonly comprising; user name, address, user email, mobile phone number, and user id assigned within the client (200), selected user preferences within the client (200), etc.

Within the field of product tracing, aggregated track-and-trace, a serialized code, hereafter referred to as a unique identifier (uid) (200) is associated with the product item (401). Nowadays the serialized code, the unique identifier (uid) (400) is printed as a QR-code or a Data Matrix code since these technologies have the required data storage capabilities. However an RFID, Near Field Communication (NFC) or any suitable data carrier solution for a product item (401) might be used to carry the unique identifier (uid) (400) within the frame of the current invention. Further the product item (401), in addition to the unique identifier (uid) (401), has additional important information associated with the product item (401). One such crucial information element is information or instructions regarding how to locate and access the system (100) that shall handle a processing request (300) from the user's client (200)—a request (300) that may involve the unique identifier (uid)(400). This information is typically held in a source related to a web address on the Internet (network) in the format "tracingsystem.com/<datasets N . . . M>", where the other associated information and datasets N . . . M on the product may be resolved or parsed and used in the subsequent processing. The techniques for parsing, deciphering, analysing or by some means or methods interpreting these datasets from the incoming request (300) is considered as belonging to the common background knowledge of the person skilled in the art.

Flexible Generic Address

Ideally the resource address (700) on the product item (401) shall be as generic as possible so that the actual location is flexible and it is possible to change it in situations where this will optimise the system (100) operations. Ideally one traceability vendor could have one single address (700) for all products in the market for all their customers such as "oneadr.com". In some cases also the same product item (401) might, and with the same generic (initial) resource address, eventually end up with different processing resources. Consider the following example to explain this effect. The same product, GreatChips, from the same manufacturer, will have the same resource "oneadr.com" location address. On the product there is no information or way to deduct that these products might have different target systems. Consider that we have product item A and product item B as described above. For the example, a request (300) regarding the unique Identifiers (uid) (401) of a portion of serialized products (401) must be processed on traceability application (601) TA001 located in Brazil, as an other portion of the unique codes (400) representing serialized product items (401) must be processed in Frankfurt on traceability application (601) TA002. It is important to emphasize that these computer resources, the traceability applications (601) TA001 and TA002 are completely independent and separate from each other and hold zero knowledge about the other. As examples, a product item A is marked "oneadr.com/ABC" and a product item B is marked "oneadr.com/123", wherein ABC and 123 are their respective unique identifiers (400) uids. Product item A has a unique identifier (uid) (400) created and originated by application TA001 located in, say, Rio de Janeiro, likewise product item B has a unique identifier (uid) (400) created and originated by TA002 located in, say, Frankfurt.

The present invention provides a solution to direct the connection for a product item (401) to the correct intended traceability application (601) as explained even though there is no way that this can be resolved or otherwise be deducted solely by the information on the product item (401) itself. The information on the product item (401) as described is hence not sufficient to link a request (300) to the originating traceability application (601). The method and system of the invention will however bridge the "gap", e.i. establish the link between the product item (401) and the itended appropriate traceability application (601) by using an intermediary traceability application director (500), hereafter called the traceability director (500). The traceability director (500) can be accessed by clients (200) using the information on any of all product items (401) using the one and constant network address (URI/URL), the network director address (700). The traceability director (500) essentially receives a request (300) from a client (200), or a user via a client (200), the request (300) comprising a unique identifier (uid) (400), and sends the request (300) to the constant network address (URI/URL), the network director address (700). The traceability director (500) uses a traceability application list or register (550). Essentially the traceability director (500) is a program resource entity that facilitates a client (200) reading a serialized code, namely the unique identifier (400) of a product item (401) to find the intended appropriate originating traceability application (601) and then link them together for further processing and interaction between the client (200) and the appropriate originating traceability application (500).

The traceability director (500) is a network computer and computing resource (proxy, network broker, etc), capable of operating and handling such resource as described related to the present invention. The traceability director (500) is implemented in a computer device that links and facilitates a product item (401) having a unique identifier (uid) (400), and the appropriate originating traceability application (601) among a plurality of traceability applications (600)

In essence, the invention makes it possible to use a single resource address, the constant (or "static") network address, the network director address (700) to the network director (500) for one or more product items (401), each product item (401) being marked or associated with an unique identifier (uid) (400), and, using the network director (500) to (re) direct (510) the request (300) with the unique identifier (uid)(400) to its unique identifier ((uid)(400)—originating appropriate application (601) amongst a plurality of potential traceability applications (600)—of which only one appropriate originating application (601) shall process the request (300, 301).

Further, in an embodiment of the invention, the network traceablity application director (500) is arranged to customize the response (800) from the appropriate originating traceability application (601) based on contextual information (333) based on the request (300, 301) itself.

Even though this description has adopted the assumption that on one single resource address, the network application director address (700), pointing to one network traceability application director (500) and from a plurality of product items (401), several resource addresses (700, 700') on a product item (401) might be employed as long as they resolve and connect to the network traceability application director (500).

In an embodiment of the invention it enables even higher efficient use of the application director (500) in situations where it is possible or feasible that the product item (401) can carry more information without other penalties or disadvantages relating to the QR-code or the employed marking technology itself, its printing and marking onto the product items (401).

In its simplest and most basic form a tracing system, a traceability application (600, 602, 601) receives an incoming request (302), in other words basically a unique identifier (uid) (400), processes the request (302), and then responds with a response (800, 801, 808). In this situation basically the traceability application (602, 601) has two pieces of information, the unique identifier (uid) (400) itself and an address (707) to send the response back to. The information and response behaviours sent back will be governed by the rules set up by the traceability application (602, 601) for that unique identifier (uid) (400). The "richness" of a response (800) for a product with a unique identifier (400) uid can vary with related to the application external information that follow the request. In this patent specification we will refer to this as contextual request information (CRIx) (333). The contextual information CRIx (333) is all information created or otherwise captured outside the application that is sent in the request 302, 301) to the traceability application (602, 601). This contextual information (CRIx) (333) might be a user profile (202) identifying information about the user—or transactional information such as time or ip-address, cookies etc, or other network or session information. Especially a user profile (202) in the request (302, 301) that is recognized and managed by the traceability application (601) is valuable for orchestrating the best possible response (800, 808, (801)) to the request (302, 301). The amount and nature of the contextual request information CRI (333) is only limited by an actual transaction itself at any given time. By way of example we will explain how contextual request information CRI (333) may influence the response from the application. Using our example above, "oneadr.com/ABC", a request ((302, 301) where contextual request information CRI (333) is not used, the response (800) from the correct originating traceability application (601) will be "Hello World". Any and all requests (302, 301) will have the very same response (800) for this situation.

Now we will consider how a request (300, 302, 301) that sends contextual request information CRI (333) to the traceability application (602, 601) along with "oneadr.com/ABC" can change its response (800) based on the contextual request information CRI (333) or parts of the CRI. The contextual request information CRI (333) has an IP-address that resolves and indicates that the user is within Norway. The application is now sending another response based on this information for the same uid=ABC as described earlier. The response from the server, instead of "Hello World" is now in Norwegian language: "Hei på deg Verden!"

The way traceability systems based on codes and serialized codes are designed, there are two main categories of contextual request information CRI. The difference between these two categories are important to understand as they will have a different impact on how the CRI is used. Therefore for the invention we denote CRIx and CRIn. CRIx is external contextual information that is not known or controlled by the application. This is information that is typically about the request and the transaction itself, typically but not limited to IP-address, time, browser details, client information, versioning information, etc.

CRIn is contextual information that is native and in full or in part known and managed by the application. For instance when a request is incoming the user might pass along the request that the user has UserID=332 that is managed by the application. In other words the application has essential information about the request user.

For a very "rich" incoming request the contextual request information might effectively be conflicting with each other. In an embodiment of the invention, the originating traceability application (601) will have internal processing that will decide what is the appropriate response (800) even the incoming has information that considered isolated would have triggered different responses, as only a response for "consideration CRIx" is possible. Some contextual request information CRI (333) will therefore be overruled in favour over another that is indicating a particular response behavior—say for instance language.

In general terms—the native contextual information CRIn is the strongest information and will in most cases be the governing response indicator.

Again using the above example the native contextual information CRIn will now again change the response to the client (200) and user. Previously the CRIx indicated that the user was in Norway and the response was given in Norwegian as per originating traceability application (601) rules. This time however some native contextual information CRIn was also sent to the request (301). A Spanish user (Pedro) has a user profile (202) and that particular user has in that user profile (202) managed by the originating traceability application (601) selected that responses shall be in Spanish. One might perceive that this user was on travel in Norway when he desired to get access to the application by a request (300). The external contextual information CRIx that indicated a Norwegian response based on the IP-address is now by the application decided to be overruled by the user's own user profile (202) information about the response behavior. The response (800) back to the client (200) will therefore now be "Hola Mundo y Pedro".

The same unique identifier uid (400) with current invention responds differently based on the unique identifier uid (400) and the contextual request information CRI (333)—whereby the response (800) might comprise a video message one time, and a text message another time, all based on the contextual request information CRI (333).

For the current invention the response (800), after the request (302, 301) has been received by the application (602, 601), is that it is the traceability application (602, 601), that processes the request ((302), 301) and decides and processes the response (800) and its behavior back to the client (200). The director (500) that sits in front of the plurality of traceability applications (600) does not hold any such rules or capabilities to that effect. The traceability application (602, 601) will have internal rules and methods for processing (or not) the request (302, 301) and determining and processing the response (800) based on the incoming contextual request information CRI (333) with external CRIx and the potential native CRIn in combination being transferred to the traceability application (602, 601) in the request (302, 301). The response (800) by the traceability application (602, 601) is also concerning the correct return location, the response address/location (707) for the originating traceablity application (601) and mapping for the response (800) further based on the unique identifier uid (400). The traceability application (602, 601), may after being determined as the originating traceability application (601) communicate with the user client (200) and any number of external applications (if otherwise allowed and possible) to further obtain information to decide how to respond. For instance, the originating traceability application (601) may receive a language setting, configuration or another preference setting from an external system that was facilitated by the user's client (200). Importantly this is still to be considered internal handling or handling rules and protocols by the originating traceability application (601), since the originating traceability application (601) is still in full and absolute control of the processing and analysis when preparing the best response and connection session (606) to the user and/or the client (200), because it is only to the user and/or client (200) the traceability application is "accountable" and answerable. All external information received and processed "internally" whatever the source by the traceability application is such only to be considered suggestive.

For instance a response (800) could simply be returned to "answer.com/44" based on unique identifier uid (400) ="ABC" for one given set of contextual request information CRI (333). However, since the CRI (333) so dictated the response (800) returned was "Authentic product" to "anysite.com" by JSON.

Importantly a response (800) may according to an embodiment of the invention not merely be determined and/or limited by the originating traceability application (601) alone. If the user and/or the user's client (200) client application (201) or application(s) has either forwarded contextual request information CRI (333) during discovering the correct originating traceability application (601) point, or later requested it after or during a session has been successfully established; then the originating traceability application's (601) response may be devised and composed due to a possible interaction with other external applications. As an example, if the request (301) came from an Amazon shopping app and that application managed a user profile (202) and the user's shopping details, the originating traceability application (601) could interact with the Amazon app (201), and related Amazon servers and databases to furnish a response (800) in the native Amazon app (201) where both applications contribute data in the response (800). The Amazon (native) data could be for instance concern a purchase order number and several other data natural to the app behavior, and further the Amazon app (201) could display or access a tracing history of a uniquely identified (400) product item (401) by data provided by the originating traceability application (601) exclusively.

One type of response (800) that is particularly useful is wherein the originating traceability application (601), based on the unique identifier uid (400) received and the rules ascending from that specific unique identifier uid (400), can invoke, trigger, map, and launch various other applications, whether these are internal to the traceability application "ecosystem" or external applications such as the Amazon shopping app (201) described above.

In an embodiment of the invention the response (800) may also forward and feed data and/or interfaces to target websites or other clients based on the rules that are associated with the unique identifier uid (400) in the originating traceability application (601). Significantly such a rules or response deciding method sets on how to potentially respond given the current circumstantial data, responded to any "random" application or client (200) is directly detected or derived from the unique identifier uid (400) within the originating traceability application (601), or, as an alternative, the response (800) might be also instructed by a client (200) in some situations as part of setting up a session. From this perspective the originating traceability application (601) can be considered as a context-reacting originating traceability application (601).

In an embodiment of the invention the format of the response (800) from the originating traceability application (601) might be of part contextual request information (333) sent from the requesting client (200) or its user where such specification or instructions are included. The format might be http, JSON, API, etc., only limited to the available formats and technologies available at the time of the request (302, 301). The format and instructions about how to respond might also be established during or after establishing a session/transaction/communication between the requesting client (200) or the user.

In an embodiment of the invention it enables a plurality of applications to interact with each other to access data for a unique identifier (200), a serialized code and a complete set of data that is concerning this product data (ascending from the serialized), including but not limited to aggregated track and trace data which includes a complete logistical and supply chain history. Its important that the user experience hence is realized by a co-operation and orchestration between the originating traceability application (601) and its interaction with a plurality of external applications.

The negotiation, handshaking, authentication, authorization, protocols, encryption schemas, session and transaction handling, implementation and necessary technical systems and methods, etc, to have two or a plurality of systems/applications interact with each other and the originating traceability application (601) in order to essentially permanently or transiently share data for any given situation and scenario is not further described herein.

The invention is particularly useful for a traceability application vendor when operating several traceability systems (100) for several different customers sharing a common global network entry point, i.e. same director (500) for all customers and unique identifier (400) marked product items (401).

A plurality of product items (401) are each provided with a unique identifier (uid) (400) and the common resource (virtual and partial) address, a network director address (700) which is used by a client application (201) in the client (200) for directing a request (300) to an application director (500).

The application director (500) is a computer implemented software which comprises a list (550) or register of traceability applications (602) that potentially can handle the request (302, (301). The list is accessible to the director (500), but does not have to be accessible by the client (200). For security reasons it may be restricted that the client cannot access the list directly. The list (550) contains reference information about the resource address (702) for every potential traceability application (602, 601) on the list (550) and all the necessary information that is required to ask a traceability application (602, 601) for whether a unique identifier uid (400) was created and originated by the queried traceability application (602, 601). Importantly the director (500) does not have to processed, interpret or analyse the query for any purpose the external contextual information CRI (333) received by the client (200) or the user. It will only pass it to the application "as is" as a chunk of data. The list/register (550) managed by the network director (550) must initially be created and then later managed by the network director system (100) owner(s). This list (550) typically is updated manually or at regular intervals. The present invention does not concern itself with how the list is managed as it is considered a task expected to be satisfactorily handled by someone skilled in the art, how to manage the list.

In an aspect the invention is comprises the following steps;

The client (200) sends a request (300) comprising the unique identifier (400) uid read from the product item (401) to the application director (500) and including contextual information, both native CRIn and external CRIx as if and when available. The application director (500) will then based on the traceability application list (550) determine which traceability applications (600) shall be forwarded the request (300). This is achieved as the application director (500) will convey the unique identifier uid (200) to the potential traceability applications (600, 602, 601) and ask for a response (800) back whether the unique identifier uid (200) was created and originated by the queried traceability application (600, 602, 601). In its basic form this is a binary response of yes/no nature. A "No" response (801) is returned from a non-originating traceability application (602), A "Yes" response (808) is returned from an originating traceability application (601).

There are several methods and strategies that the application director can deploy for contacting the applications on the list, and in such a way lower the traffic burden and as well shorten the time to receive an affirmative "yes" from the correct application (601). For instance a sequential approach might be used, please see FIG. 1, wherein the application director (500) simply starts on top of the list (550) and asks that application (602, 601) whether it is the correct one originating traceability application (601), please see FIG. 1 If the answer (800, 802) is "no" the second application (602, 601) on the list will be asked, and so on until a response (800, 808) "yes" will be received and the correct originating traceability application (601) has been found. Then the director (500) does not have to proceed further on the list (550). This may be advantageous if some of the empirically most used/most queried traceability applications on the list (550) are sorted to the top and the list (550) is in descending order. Another strategy is to ask all applications (600, 602, 601) on the list (550) simultaneously and filter all the incoming answers from the application to find the positive response (808) "yes" and then the correct originating traceability application (601) has been found. Or there might be other strategies that can combine the above or use grouping or sorting of the list that will lead to the answer the fastest possible way. Or the method can be designed and optimised to reduce traffic load. The director (500) can within the scope of the invention comprise an analysing method, algorithm or tool that will employ an efficient query method based on the list.

Since a request is typically encoded as an Uniform Resource Identifier (URL) or Universe Resource Locator (URI), the size of the request is less than 1 KB in size, so the network load is trivial.

Further it is possible to distribute the traceability application list (550) by creating and managing copies (550') that can be distributed on one or more network director replicas (500)' that can be used in the same manner as network director (500) in a load balancing schema. This will enable optimization of network traffic, for instance larger regions might have one director copy/replica (500') such that a "local" request (300) is routed to that network director (500') first and such reduces the latency of the request (300) to a director coming from that region.

After the correct originating traceability application (601) has been identified by the director (500), the director (500) facilitates (606) a direct session and further transactions between the client (200, 201) and the originating traceability application (601). After the session and connection (606) between client (200) and originating traceability application (601) has been confirmed, the director (500) communication is dropped from the request and the task for the request is completed for the director.

The director (500) might generate and store a secured request log.

The contextual information (333) is passed to the originating traceability application (601) that may at its own discretion potentially use this information to further compose the best response (800) to the client (200).

Essentially prior art uses contextual information (i.e. information external in relation to the application itself) for two main purposes; firstly routing a request to the correct application resource, and then having the resource compose a response based on said contextual information.

Comparing prior art and the current invention one fundamental aspect of the current invention is to be observed. As opposed by prior art, the current invention is exploiting two fundamental and constantly present attributes of traceability systems that are based on using unique identifiers, "uid"s. Firstly, any such traceability application is capable of responding conclusively based on the uid only whether the uid was created and originated by that application. That means that the uid on a product or any object associated with the uid can be used without any contextual information whatsoever to determine the right traceability application for the uid in question. The traceability application only needs the unique identifier uid to determine this. Secondly, when the uid has been recognized by the application in reality the application has the capabilities and the sufficient internal information to itself compose a customized response to the request. If not, it can simply demand or request such information from the user or the requesting client as per session and requirements.

In one embodiment of the invention, the traceability application might not have created the unique identifier uid or it was not originated within that first traceability system. However, due to the architecture of the total overall traceability system the traceability application within the present invention is the connection represented with the first and correct entry point to the overall traceability system as a whole. It is such per definition the correct, originating traceability application (601) even if there are underlying or connected systems that actually created the unique identifier uid. That is to say that in this situation a plurality of applications that are coupled, linked or otherwise connected with other, the traceability application is considered to be where the first point of entry for the uid that can be determined or discovered, even thus the originating traceability application (601) per se might not be the creator of the uid or even not the originating application. In this situation technically the invention is carried out essentially in the same way. The definition of the traceability application used by the invention is then expanded to also encompass an application that manages said uid by having been delegated authority and ascendancy of a system that originally created and originated the uid.

Another problem with prior art that is solved with the current invention is especially the contextual information that is particularly related to a given user. This information is what has the highest information density about how the application should behave since this contains the "wishes", preferences and chosen configuration parameters of the user. However, this creates a problem for prior art since this information must be considered sensitive and shall to the least possible extent be stored outside the application. This fact might limit in practise the contextual information accessible by the redirector as described in prior art.

There are no such limitations for the current invention since it only is used and processed by the originating traceablility application (601) and it does not have to leave the originating traceability application.

Moreover, in the current invention, the application, once having made the connection (606) with the client based on the uid yes response only, can during the communication and session ask for this type of information to drive the response and interaction forward.

In other words, even the current invention can make use of external contextual information from the user and client, the basic technical effect is to find, locate access the right and originating traceability application, and realise that once this is achieved the originating traceability application (601) itself will handle the remainder of the communication properly essentially in the same way if the uid and product in fact had a native resource address to the originating traceability application directly.

| Components list | |
|---|---|
| 100 | System |
| 101 | Network |
| 200 | Client/user |
| 201 | app on client (200) |
| 202 | user profile, authorisation for the user to interact with the client (200) |
| 300 | Request received by the network director (500) |
| 301 | Request received by the originating traceability application (601) |
| 302 | Request received by a traceability application (602) |
| 333 | Contextual (CRIn, CRIx) request information, CRI |
| 400 | Unique identifier (UID) |
| 401 | Object associated with an unique identifier |
| 500 | Network traceability application director |
| 550 | List/register of traceability applications |
| 600 | Plurality of traceability applications |
| 601 | (The unique identifier) Originating traceability application |
| 602 | Traceability application |
| 606 | Connection/session facilitated between the originating traceability application 601 and the user/client 200 |
| 700 | Address/location to the network director |
| 702 | Address/location for a traceability application |
| 707 | Response address/location for an originating traceability application |
| 800 | Response from a traceability application |
| 801 | "No" response from a non-originating traceability application |
| 808 | "Yes" response from a non-originating traceability application |
| 820 | "UID/system not found" response |

The invention claimed is:

1. A computer implemented traceability application network director system in a network, comprising:
one or more first computers provided with a plurality of traceability applications, the plurality of traceability applications being programmed to generate and/or manage a plurality of unique identifiers to be marked on a plurality of serialized product items;
a list comprising said plurality of traceability applications and resolvable network addresses/locations of each of said plurality of traceability applications;
a network director;
one or more second computers being clients including a device programmed to read one or more of said plurality of unique identifiers from one or more of said marked serialized product items; and
wherein each of said plurality of serialized product items being marked with a unique identifier of said plurality of unique identifiers,
wherein each said unique identifier is initially created and originated or managed by an associated originating traceability application within said plurality of traceability applications, wherein all said serialized product items are marked with a network address or location to said network director within said network, wherein said client or a user via said client sends an initial request to said network director, said initial request comprising said read unique identifier marked on said serialized product item, to establish a connection to said originating traceability application, wherein said network director includes a processor programmed to:

receive said read unique identifier read from said marked, serialized product item from said user and/or client;

access and manage said list;

send a subsequent request comprising said read unique identifier to one or more traceability applications of said list of said plurality of traceability applications, said subsequent request comprising requesting one or more traceability applications of said one or more traceability applications to respond whether said traceability application recognizes said read unique identifier as created or managed by said traceability application; and receive a response from said traceability application, wherein in response to said response being negative, said response is then disregarded, wherein in response to said response to said subsequent request being a positive or affirmative response, said network director is programmed to establish or facilitate a network connection between said requesting client with regard to said read unique identifier of said initial request, and said affirmative responding traceability application, wherein the network director is programmed to send said subsequent request to said plurality of traceability applications in said list without itself processing and analyzing the initial request, until said positive or affirmative response is received, and wherein said computer implemented traceability application network director system is programmed in such a manner that it is each said traceability application itself that determines whether said unique identifier is created or managed by said traceability application, and said affirmative responding traceability application is programmed to exclusively process said read unique identifier so as to determine whether said read unique identifier in said subsequent request received from said network director is internally recognized and thus internally originated or managed, which results in said positive or affirmative response.

2. The system of claim 1, wherein said network director is programmed to send said subsequent request to one by one of each said traceability application in said list, until said response is a positive or affirmative response, and then not send further requests to further traceability applications in said list.

3. The system of claim 2, wherein contextual information is included in said subsequent request to said traceability application, said contextual information comprising an instruction to not return a negative response in case said traceability application is not an originating traceability application of said unique identifier.

4. The system of claim 3, wherein, in response to an affirmative response having not been received when said list of traceability applications is exhausted a response which comprises a message "a unique identifier originating traceability application not found" response is then returned to said client.

5. The system of claim 1, said traceability application being programmed to manage unique identifiers and aggregated track and trace information based on said unique identifier, whereby said traceability application is arranged to:

receive said unique identifier;

receive contextual information pertinent and applicable to the request itself;

determine if said unique identifier was created and/or is managed by said traceability application; and in response to said unique identifier being created and/or managed by said traceability application being an originating traceability application, process and compose a response according to and based on internal rules and instructions associated with said unique identifier and said received request contextual information.

6. The system of claim 1, wherein said network director is arranged to send said subsequent request simultaneously to all traceability applications in said list.

7. The system of claim 6, wherein contextual information is included in said subsequent request to said traceability application, said contextual information comprising an instruction to not return a negative response in case said traceability application is not an originating traceability application of said unique identifier.

8. The system of claim 6, wherein, in response to an affirmative response having not been received when said list of traceability applications is exhausted, a response which is a unique identifier originating traceability application "not found" response is then returned to said client.

9. The system according to claim 6, said traceability application being programmed to manage said unique identifiers and aggregated track and trace information based on said unique identifier, whereby said traceability application is arranged to:

receive said unique identifier;

receive contextual information pertinent and applicable to said subsequent request itself;

determine if said unique identifier was created and/or is managed by said traceability application; and in response to said unique identifier being created and/or managed by said thus originating traceability application, process and compose a response according to and based on internal rules and instructions associated with said unique identifier and said received request contextual information.

10. A method for establishing or facilitating a network connection between a client and a traceability application in a network, wherein the traceability application is implemented on a first computer and is programmed to generate and/or manage a plurality of unique identifiers to be marked on a plurality of serialized product items, wherein said client is implemented on a second computer and includes a reading device programmed to read one or more of said plurality of unique identifiers, wherein said method comprises:

providing a plurality of traceability applications;

providing a list comprising a plurality of resolvable network addresses/locations of each of said plurality of traceability applications;

providing a plurality of serialized product items, each marked with a unique identifier of said plurality of unique identifiers;

wherein each said unique identifier is initially created and originated or managed by an associated originating traceability application within said plurality of traceability applications, wherein all said serialized product items are marked with a network address or location to a network director including a processor within said network;

said client reading said unique identifier marked on a serialized product item and network address or location to said network director, said client sending an initial request to said network director, said initial request comprising said unique identifier associated with said serialized product item, in order for said network director to establish a connection between said client and said originating traceability application;

wherein said network director includes a processor programmed to a) receive said unique identifier associated with said serialized product item from said client;

b) access and manage said list, and send a subsequent request comprising said read unique identifier to one or more traceability applications of said list of said plurality of traceability applications;

c) request via said subsequent request each traceability application of said one or more traceability applications to respond whether said each traceability application recognizes said unique identifier as created or managed by said each traceability application; and d) receive a response from said each traceability application, wherein in response to said response to said subsequent request being a positive or affirmative response, the network director is programmed to establish or facilitate a network connection between said client with regard to said unique identifier of said initial request, and said affirmative responding traceability application, wherein the network director is further programmed to send said subsequent request to the plurality of traceability applications in said list without itself processing and analyzing the initial request, until said positive or affirmative response is received, and wherein it is each traceability application that determines whether said unique identifier is created or managed by said traceability application, and said affirmative responding traceability application is programmed to exclusively process said unique identifier so as to determine whether the internally recognized unique identifier is an originated or managed unique identifier, which results in said positive or affirmative response.

11. The method of claim 10, wherein said network director is programmed to send said subsequent request to one by one of each traceability application in said list until said response is a positive response, and then not send further requests to further traceability applications in said list.

12. The method of claim 11, wherein said subsequent request to said traceability application includes contextual information, said contextual information comprises an instruction to not return a negative response in case said traceability application is not the originating traceability application of said unique identifier.

13. The method of claim 10, wherein in response to said response being negative ("no"), said response is disregarded.

14. The method of claim 12, wherein, in response to an affirmative "yes" response having not been received when said list of traceability applications is exhausted, then a response is returned which comprises a message stating "a unique identifier originating traceability application not found" to said client.

15. The method of claim 10, said traceability application managing unique identifiers and aggregated track and trace information based on said unique identifier, whereby said traceability application is programmed to:

receive said unique identifier;

receive contextual information pertinent and applicable to said subsequent request itself;

determine if the unique identifier was created and/or is managed by said traceability application; and in response to the unique identifier being created and/or managed by said traceability application thus identifying said traceability application as an originating traceability application, process and compose a response according to and based on internal rules and instructions associated with said unique identifier and contextual information in the received said subsequent request.

16. The method of claim 10, wherein said network director is programmed to send said subsequent request simultaneously to all traceability applications in said list.

17. The method of claim 16, wherein said subsequent request to said traceability application includes contextual information comprising an instruction to not return a negative response in case said traceability application is not an originating traceability application of said unique identifier.

18. The method of claim 16, wherein, in response to an affirmative response having not been received when said list of resolvable network addresses/locations directing to traceability applications is exhausted, a response of "originating traceability application not found" is returned to said client.

19. The method according to claim 16, wherein said traceability application is programmed to manage unique identifiers and aggregated track and trace information based on said unique identifier, whereby said traceability application is programmed to:

a) receive said unique identifier;

b) receive contextual information pertinent and applicable to said subsequent request itself;

c) determine if said unique identifier was created and/or is managed by said traceability application; and d) in response to said unique identifier being created and/or managed by said thus originating traceability system, process and compose a response according to and based on internal rules and instructions associated with said unique identifier and contextual information in the received said subsequent request.

20. The system of claim 1, wherein in response to said response to said subsequent request being a positive or affirmative response, said network director is programmed to connect the client with said originating traceability application to establish said network connection to return an address or location for said originating traceability application to said client.

* * * * *